United States Patent [19]

Boochever et al.

[11] 4,042,016

[45] Aug. 16, 1977

[54] ENVIRONMENTAL HUMIDIFICATION AND COOLING SYSTEM

[76] Inventors: Evelyn Boochever; Michael Munk, both of 28 Dorchester Drive, Port Chester, N.Y. 10573

[21] Appl. No.: 625,923

[22] Filed: Oct. 28, 1975

[51] Int. Cl.[2] .......... F24F 3/14

[52] U.S. Cl. .......... 165/20; 62/176 C; 126/113

[58] Field of Search .......... 261/DIG. 48, 78 A, 30, 261/DIG. 78; 239/102, DIG. 20; 62/176 C, 176 R, 121, 309; 236/44 B; 165/19, 20; 126/113

[56] References Cited

U.S. PATENT DOCUMENTS

| | | | |
|---|---|---|---|
| 2,804,067 | 8/1957 | Elgin | 126/113 |
| 2,884,205 | 4/1959 | Van Buren | 261/78 |
| 3,103,105 | 9/1963 | Weil | 62/176 C |
| 3,326,538 | 6/1967 | Merritt | 261/48 |
| 3,570,472 | 3/1971 | Santangelo | 126/113 |
| 3,662,557 | 5/1972 | Morgan | 261/78 |
| 3,774,846 | 11/1973 | Schurig et al. | 239/102 |
| 3,835,810 | 9/1964 | Hughes | 239/102 |
| 3,872,684 | 3/1975 | Scott | 62/183 |
| 3,874,595 | 4/1975 | Rindisbacher | 239/102 |
| 3,990,427 | 11/1976 | Clinebell | 126/113 |

*Primary Examiner*—William E. Wayner
*Assistant Examiner*—Robert Charvat
*Attorney, Agent, or Firm*—Charles E. Baxley

[57] ABSTRACT

An environmental humidification and cooling system including an ultrasonic spray nozzle. Humidification is effected by spraying atomized water by the ultrasonic nozzle into the suction chamber of a fan. The cooling includes the ultrasonic spray nozzle spraying the atomized water into an entering air stream to effect evaporative cooling. Simultaneous evaporative cooling and humidification for an enclosed environment is effected by the spraying of moisture into a return air stream by the ultrasonic spray nozzle.

8 Claims, 7 Drawing Figures

ENVIRONMENTAL HUMIDIFICATION AND COOLING SYSTEM

BACKGROUND OF THE INVENTION

The present invention relates to an environmental air humidification and cooling system.

Certain closed environments such as computer rooms require air conditioning that has a fixed cooling and rigid humidity control for a proper machine environment. In known systems, dehumidification and cooling are achieved by the control of cooling coils and humidification is achieved by evaporating water within the body of the air conditioning unit by the use of immersion heaters or evaporation lamps or in some cases steam injection.

In prior art systems, air is heated by equipment operated within the computer room and is returned to the air conditioning unit. This return air is drawn through filters and blown through cooling coils. The cooling coils are temperature controlled to satisy either the leaving temperature or the room temperature directly. The humidity in the room is sensed and the unit will dehumidify or humidify to maintain the room set point. By use of the air conditioning controls during humidification, the air must be far enough from saturation to accept moisture and this causes subcooling to accomodate the additional moisture and the inherent temperature rise.

In the known air conditioning units, air is cooled in condenser units which are completely dependent on the ambient dry bulb temperature of the air therein. Thus, if the air that is entering the condenser has been heated by equipment in the environment, or if it is outside air during the hot summer period, the air conditioning unit has an overall lower performance and lower efficiency.

Closed environment air conditioning systems also require winter cooling as well as winter humidification. In the winter, air conditioning systems have normal operating ranges of from 74° to 78° F and from 20 to 16% relative humidity. In environments of this type, such as in buildings, it can be shown that the internal vapor pressure is essentially in equilibrium with the external vapor pressure. Additionally, there is a stack effect created by the cold heavy air mass against the warm dry air building. Therefore winter humidification as well as cooling is a desirable characteristic in the system.

Known devices that are used for positive humidity control for winter humidification have significant energy consumption. For example steam grids add humidity effectively but can increase steam consumption 5 to 6 percent, as well as boiler water make up rates. Some steam systems are sources of odors due to the chemical treatment of the steam. Air washers of the cellular or spray type usually require additional and significant fan horsepower and many necessitate usage of preheat coils as well.

SUMMARY OF THE INVENTION

The main object of the present invention is to provide a cooling system and humidification system which will eliminate the disadvantages of prior art air conditioning systems.

It is another object of the present invention to provide a cooling and humidification system that can be used during both summer and winter conditions and which will operate at greater efficiencies than known systems.

It is still a further object of the present invention to provide a system that can lend itself to the modification of existing air conditioning units.

These and other objects of the present invention are achieved by the cooling and humidification system of the present invention, which comprises an ultrasonic spray nozzle for spraying atomized water. Simultaneous cooling and humidification is effected by spraying the atomized water into the return or mixed air stream of the system to effect evaporative cooling and humidification even during winter conditions. By depressing the temperature of the entering air by evaporative cooling, the condensing cooling means of the system will benefit in both performance and efficiency. The evaporative cooling of the recirculating air mass will reduce the dry bulb temperature and increase the wet bulb temperature, thereby substantially offsetting the use of cooling energy in systems not utilizing mixing or economizer cycles for outdoor air cooling usage. Additionally, the stack effect condition can be considerably alleviated by humidification which increases the mass density of the air.

Having in mind the above and other objects that will be obvious from an understanding of the disclosure, the present invention comprises a combination and arrangement of parts illustrated in the presently preferred embodiments of the invention which are hereinafter set forth in sufficient detail to enable those persons skilled in the art to clearly understand the function, operation, construction and advantages of it when read in conjunction with the accompanying drawings.

DETAILED DESCRIPTION OF THE PREFERRED EMBODIMENTS

Figure 1:
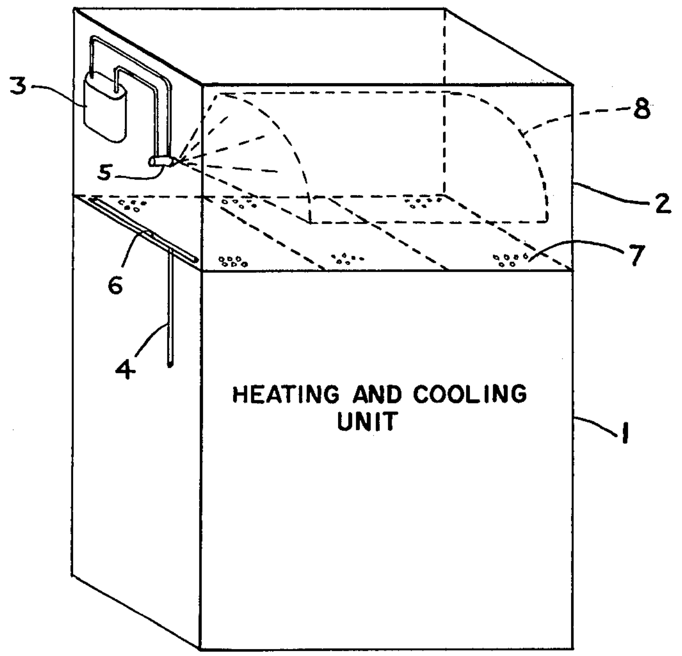
FIG. 1 is a perspective view of a cooling and humidification system according to the present invention.

FIG. 1 is shows an air conditioning unit 1 having a top portion or plenum 2 with an open face to the room. Located in the top portion or plenum 2, is ultrasonic spray means including ultrasonic spray nozzle 5 and the compressor and the controls for the spray nozzle 3. The ultrasonic spray nozzle 5 atomizes water that is supplied thereto by the use of a high velocity gas flow from a compressor or the like which creates a standing sonic shock wave therein. As the pressurized gas such as air flows into the nozzle, liquids such as water are pumped into the shock wave and are vigorously sheared into fine droplets.

The atomized spray or moisture is applied in a conical spray cone 8 to the air returning to the unit in top portion 2 and acts to simultaneously flash cool or evaporatively cool and humidify the returning air, yielding a temperature drop as the air is simultaneously being humidified. The air is then filtered through filter 7 and fed into the air conditioning unit thus reducing the cooling load thereon. The condensed spray or unused moisture flows down drip gutter 6 through tube 4 to the bottom of the unit 1.

The use of the ultrasonic spray nozzle reduces the size of the water particles to the 10 to 20 micron range. Any solids that are present in the air stream or in the water can be filtered out by filter 7 since the pollutants have a size that is much greater than the minute size of the water droplets.

Figure 2:
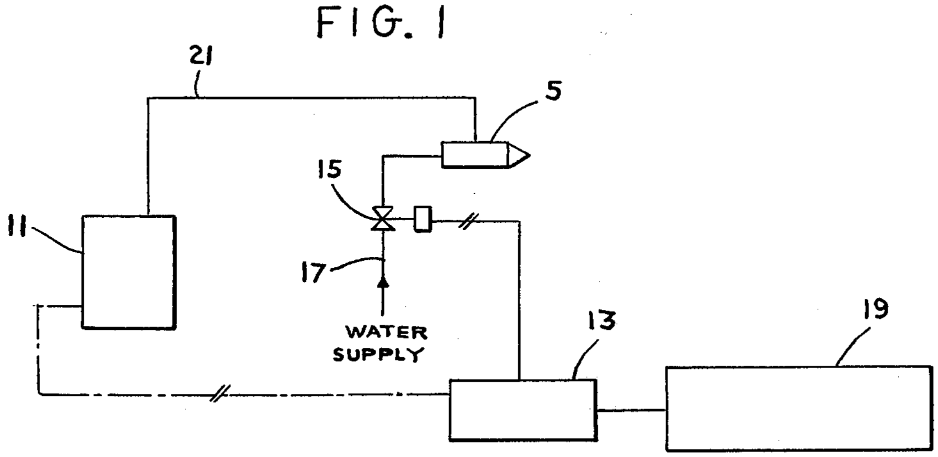
FIG. 2 is a schematic diagram of an all electric control for the system shown in FIG. 1.

FIG. 2 shows the all electric control for the system of FIG. 1. Nozzle 5 receives a flow of pressurized air from compressor 11 through air line 21 and the nozzle 5 receives a supply of water through water line 17 that is controlled by electric solenoid valve 15. Humidistat 19 senses the humidity of the environment and controls the humidifier relay 13 when the humidity exceeds a given value. The humidifier relay 13 then controls electric solenoid valve 15 and air compressor 11 to turn them off and thus reduce the humidity of the resulting cooled air. When the humidistat 19 senses that the humidity is below the given value, the humidifier relay then turns on the air compressor 11 opens the solenoid valve 15 to permit humidification of the returning air.

Figure 3:
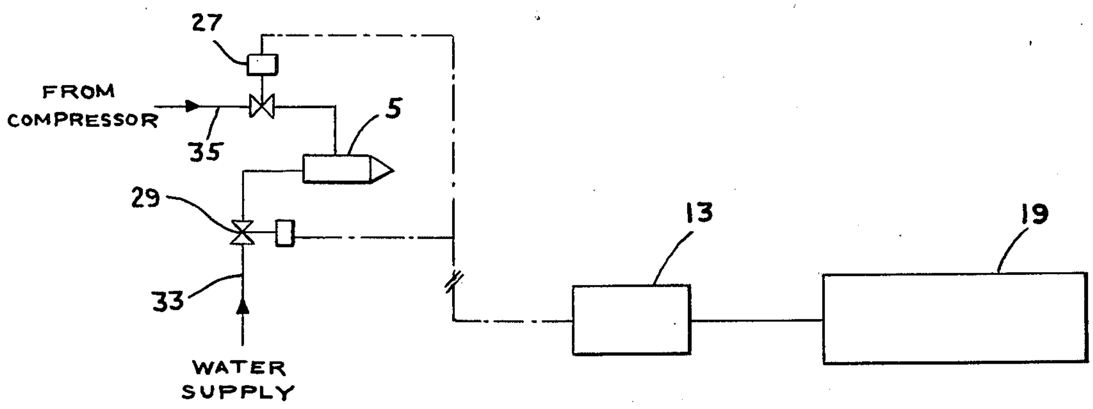
FIG. 3 is a schematic diagram for an all pneumatic control of the system shown in FIG. 1.

In FIG. 3, pneumatic control is provided for the system. Nozzle 5 has the air supplied on air line 35 and is controlled by pneumatic control valve 27. The water is supplied on water line 33 and is controlled by pneumatic control valve 29. The humidistat 19 senses the humidity in the room in a manner similar to the electric control and the pneumatic humidifier controller 13 modulates the pneumatic control valves 27 and 29.

Figure 4:
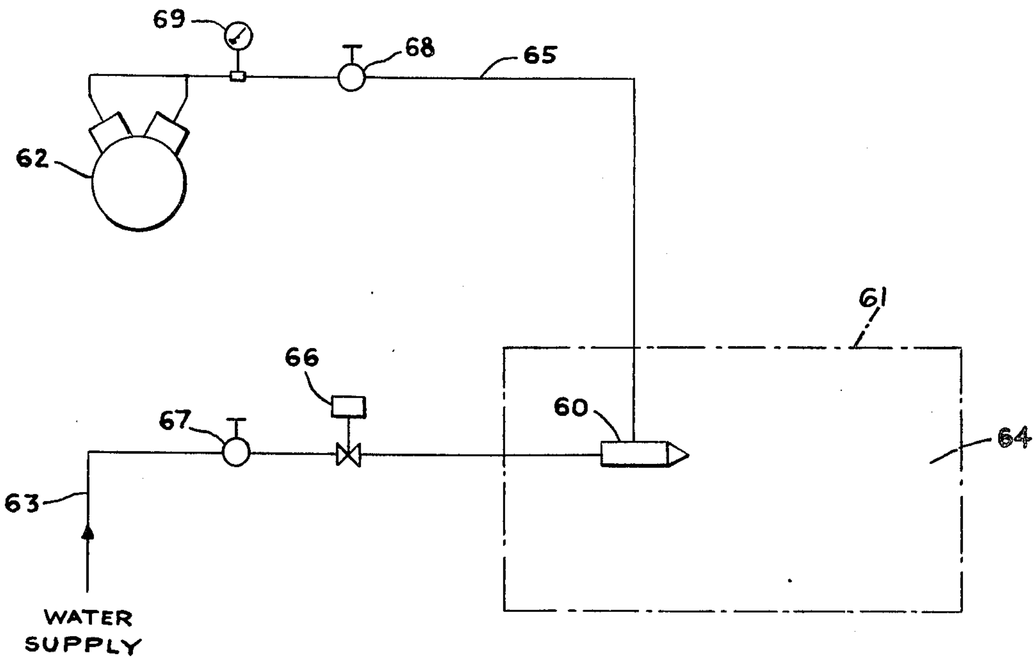
FIG. 4 is a schematic diagram of an embodiment of a humidification system according to the present invention.
Figure 5:
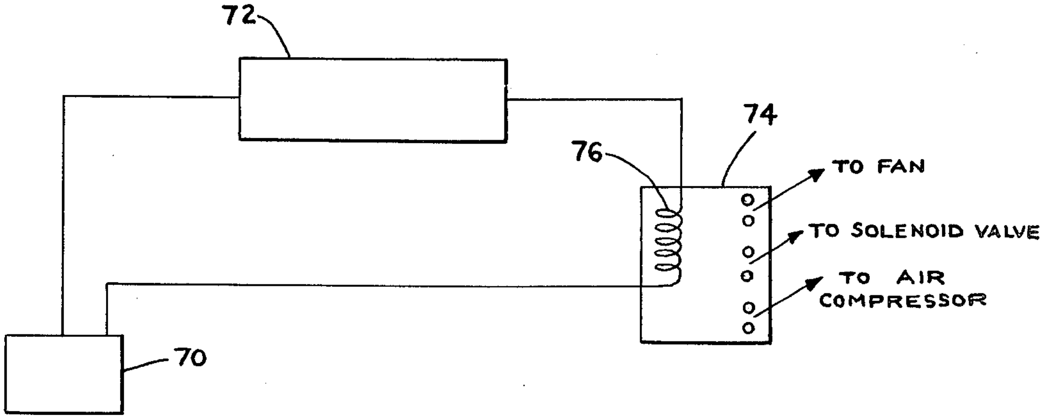
FIG. 5 is a schematic diagram of the control for the system of FIG. 4.

FIGS. 4 and 5 illustrate the application of the present invention as a humidification system wherein the ultrasonic nozzle 60 is installed in the fan suction chamber 64 of a fan 61. The nozzle 60 is supplied compressed air by compressor 62 through air line 65 having needle valve 68 and pressure gauge 69 thereon. Water is supplied to the nozzle 60 through water line 63 which having solenoid valve 66 and a needle valve 67 thereon. The control over the humidification is shown in FIG. 5 including the humidistat 72 which senses the humidity in the environment. The humidistat 72 controls relay 74 having relay coil 76 and the two are connected in series with the control transformer 70. The relay 74 is a three pole single throw relay and when the humidistat 72 closes the circuit signifying that the humidity has gone below a predetermined level, the relay is energized and the fan 61, the solenoid valve 68 and the air compressor 62 are all enabled by the switching of the relay to turn on and to provide humidification. Pneumatic control devices may be used interchangeably with any described electric control device.

Figure 6:
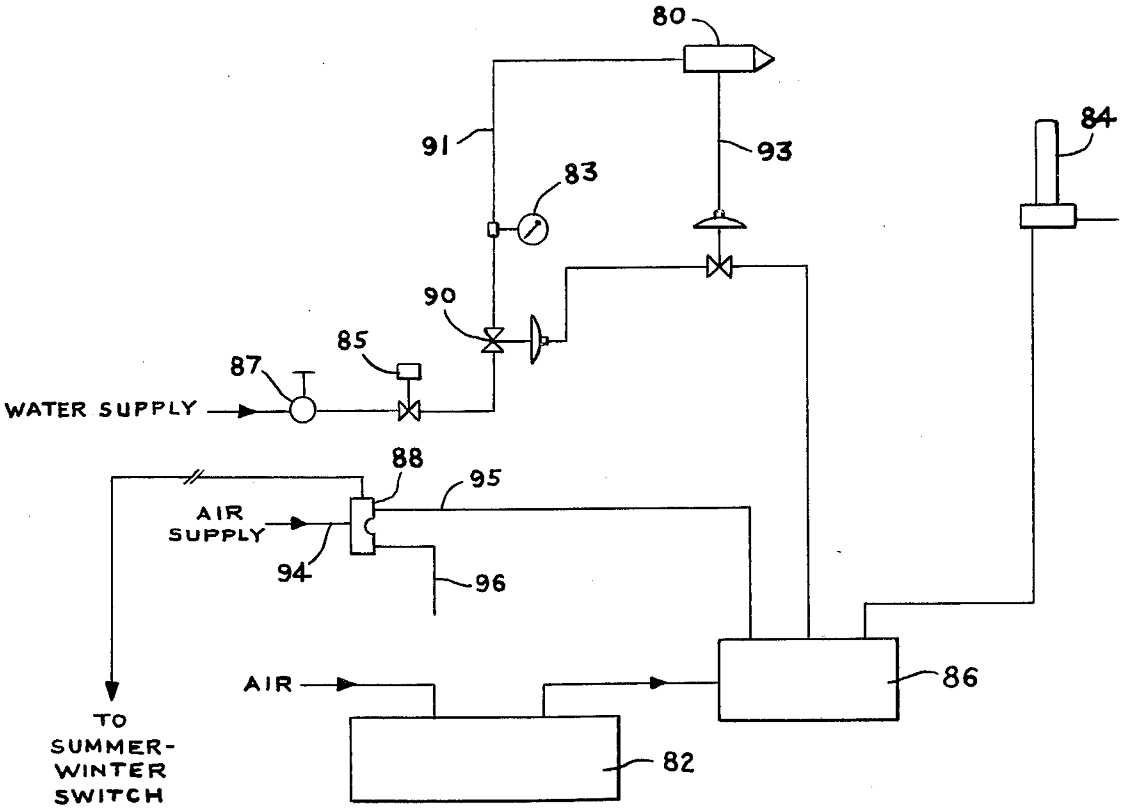
FIG. 6 is a schematic diagram of the humidification and cooling system according to the present invention.

FIG. 6 shows an application of the present invention for evaporative cooling in an air conditioning unit. The evaporative cooling to a recirculating air mass will reduce the dry bulb temperature and increase the wet bulb temperature to substantially off-set the use of cooling energy. In the system shown in FIG. 6, a fixed minimum outside air is utilized and continual air conditioning throughout the operating year is required. Under normal conditions, the operation must provide reasonable insulation and perimeter heating to avoid condensation of a 30% relative humidity air mass. Also the system typically must operate with a 20 to 30% outside air rate and it must have the ability to do winter cooling with approximately 60° to 63° F dry bulb air.

The system shown in FIG. 6 has a pneumatic control cycle. The ultrasonic nozzle 80 is supplied with water through water line 91 having pressure gauge 83 thereon and which is controlled by normally closed modulating water valve 90, needle valve 87 and solenoid valve 85. The air input to the ultrasonic nozzle 80 is supplied through air line 93 which is controlled by receiver controller 86 which also controls the normally closed modulating water valve 90. The receiver controller 86 is connected to the discharge duct mounted thermostat 84 which has a summer-winter switch (not shown) thereon set to a given temperature such as 60° F for winter. The receiver controller 86 is also fed by high limit humidistat 82 which receives a given air pressure supply and which overrides the receiver controller 86 if the humidity goes beyond a predetermined high limit. The evaporative cooling electric control valve 88 is wired to the summer-winter switch and is also connected through air line 94 to the main or auxilliary air supply and through air line 95 to the receiver controller 86. Air line 96 provides a bleed therefor and the electric control valve 88 provides a given pressure air supply to controller 86. Any listed electrical control device may be replaced by its pneumatic counterpart.

In operation, the summer-winter switch energizes the evaporative cooling electric control valve 88 through the action of the discharge duct mounted thermostat 84. This permits the evaporative cooling of the mixture of returned air mass and fresh air mass. The high limit humidistat 82 will override and maintain a maximum humidity to avoid condensation. When the system switches over to cooling, the electric control valve 88 is de-energized.

The cycle of operation can be controlled electrically or electronically in an analogous manner to the above described pneumatic operation, giving freedom in assembly of the most reliable system components.

Figure 7:
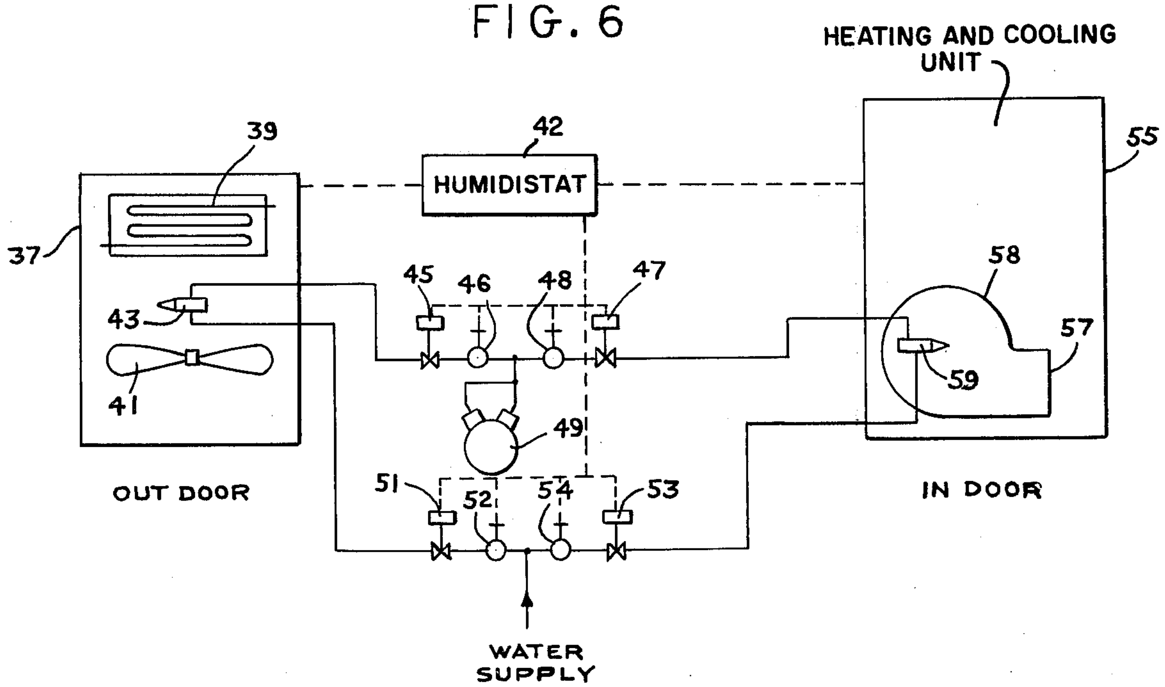
FIG. 7 is a schematic diagram of another embodiment of the cooling and humidification system of the present invention.

FIG. 7 illustrates an air conditioning system wherein the evaporative cooling is applied to a standard air cooled condenser 37 and humidification is applied to the fan of a heating/cooling unit 55.

The system includes heating/cooling unit 55 which includes fan 57 having the ultrasonic spray nozzle 59 disposed in the suction chamber 58 thereof. The heating/cooling unit 55 is receptive of the return or recirculated indoor air in the environment. The condenser cooling unit 37 receives outdoor air and includes condenser coil 39 and condenser fan 41 and ultrasonic spray nozzle 43 for supplying the evaporative cooling spray. Compressor 49 provides the pressurized air for spray nozzle 43 through needle valve 46 and normally closed solenoid valve 45. Nozzle 59 receives the air supply from compressor 49 through needle valve 48 and normally closed solenoid valve 47. The water supply to nozzle 43 is supplied through needle valve 52 and normally closed solenoid valve 51 and the water supply to nozzle 59 is supplied through needle valve 54 and normally closed solenoid valve 53.

The controls for the solenoid valves and the fan and the compressor are similar to the pneumatic or electric control systems described heretofore. In operation, when the system is cooling, a relay (not shown) starts the fan 57 and the air compressor 49 and opens valves 45 and 51 as well as starting the normal cooling function of the heating/cooling unit 55. As a result, the atomized water is discharged into the air stream of the air cooled condenser 37 causing flash cooling of the turbulent air mass therein. The air cooled by the evaporative cooling in the condenser 37 is then fed to the condenser coil unit 39 and is discharged by the fan 41. This configuration varies slightly in physical placement of the coil 39 and the fan 41 due to the large variety of commercial units available on the present market.

When the system is heating, the fan 57 is actuated, as is the air compressor 49 and solenoid valves 53 and 47 enabling humidification of the air blown through fan 57 when called for by the humidistat.

While preferred embodiments of the invention have been shown by way of example in the drawings, it will be understood that the invention is in no way limited to these embodiments.

What is claimed is:

1. In a closed environment air conditioning system receptive of air to be conditioned:

a heating/cooling unit including a chamber receptive of recirculating air before the air enters the heating-/cooling unit:

means for simultaneously evaporatively cooling and humidifying the air to the conditioned comprising actuatable ultrasonic spray means including an ultrasonic spray nozzle positioned to spray into the recirculating air in the chamber and receptive of a supply of water during use for atomizing the water and spraying same into the air to be conditioned and controllable compressor means for supplying pressurized air to the ultrasonic spray nozzle; and means for actuating and deactuating the ultrasonic spray means to control the level of humidification in the conditioned air.

2. In an air conditioning system according to claim 1, wherein the actuating means comprises a humidistat, a solenoid valve controlling the supply of water to the spray nozzle and relay means responsive to the humidistat for controlling the compressor means and the solenoid valve.

3. In an air conditioning system according to claim 2, wherein said actuating means further comprises a second solenoid valve controlling the supply of pressurized air to the spray nozzle and wherein said relay means has means controlling said second solenoid valve.

4. In an air conditioning system according to claim 1, wherein the system is a closed environment system having a heating/cooling unit and including a chamber receptive of recirculating air before the air enters the heating/cooling unit and wherein said ultrasonic spray nozzle is positioned to spray into the recirculating air in the chamber.

5. In an air conditioning system receptive of air to be conditioned;

an air cooling condenser:

means for simultaneously evaporatively cooling and humidifying the air to be conditioned comprising actuatable ultrasonic spray means including an ultrasonic spray nozzle positioned to spray into air before entering the cooling condenser and receptive of a supply of water during use for atomizing the water and spraying same into the air to be conditioned and controllable compressor means for supplying pressurized air to the ultrasonic spray nozzle; and means for actuating and deactuating the ultrasonic spray means to control the level of humidification in the conditioned air.

6. In an air conditioning system according to claim 5, wherein the actuating means comprises a humidistat, a solenoid valve controlling the supply of water to the spray nozzle and relay means responsive to the humidistat for controlling the compressor means and the solenoid valve.

7. In an air conditioning system according to claim 6, wherein said actuating means further comprises a second solenoid valve controlling the supply of pressurized air to the spray nozzle and wherein said relay means has means controlling said second solenoid valve.

8. In an air conditioning system receptive of air to be conditioned: an air cooling condenser receptive of air to be conditioned; a heating/cooling unit receptive of air to be conditioned; blowing means having an air suction chamber receptive of refrigerant from the cooling condenser and the heating/cooling unit; means for simultaneously evaporatively cooling and humidifying the air to be conditioned, comprising actuatable ultrasonic spray means receptive of a supply of water during use for atomizing the water and spraying same into the air to be conditioned wherein said ultrasonic spray means comprises a first ultrasonic spray nozzle positioned to spray into said suction chamber; and means for actuating and deactuating the ultrasonic spray means to control the level of humidification in the conditioned air including means for alternatively actuating the first or second spray nozzle in dependence upon temperature conditions and control signals.

* * * * *

REEXAMINATION CERTIFICATE (658th)

United States Patent [19]

[11] B1 4,042,016

Boochever et al.

[45] Certificate Issued Mar. 31, 1987

[54] ENVIRONMENTAL HUMIDIFICATION AND COOLING SYSTEM

[76] Inventors: Evelyn Boochever; Michael Munk, both of 28 Dorchester Dr., Port Chester, N.Y. 10573

Reexamination Request:
No. 90/000,960, Feb. 18, 1986

Reexamination Certificate for:

Patent No.: 4,042,016
Issued: Aug. 16, 1977
Appl. No.: 625,923
Filed: Oct. 28, 1975

[51] Int. Cl.[4] .......... F24F 3/14
[52] U.S. Cl. .......... 165/20; 62/176.4; 126/113
[58] Field of Search .......... 165/16, 19; 236/44 B, 236/44 R; 239/310; 62/176.4, 305

[56] References Cited

U.S. PATENT DOCUMENTS

| | | | |
|---|---|---|---|
| 1,953,727 | 4/1934 | Russell et al. | 261/26 |
| 2,110,025 | 3/1938 | Ridge | 236/44 |
| 2,187,905 | 1/1940 | Killingsworth | 62/176 |
| 2,338,382 | 1/1944 | Marlow | 257/3 |
| 2,528,982 | 11/1950 | Touton | 236/44 |
| 2,702,994 | 3/1955 | Borgerd | 62/305 X |
| 2,720,088 | 10/1955 | Hailey | 62/6 |
| 2,804,067 | 8/1957 | Elgin | 126/113 |
| 2,884,205 | 4/1959 | Van Buren | 239/412 |
| 2,935,375 | 5/1960 | Boucher | 23/2 |
| 3,103,105 | 9/1963 | Weil | 62/172 |
| 3,299,620 | 1/1967 | Hollingworth | 55/126 |
| 3,318,535 | 5/1967 | New | 239/310 |
| 3,326,538 | 6/1967 | Merritt | 261/28 |
| 3,570,472 | 3/1971 | Santangelo | 126/113 |
| 3,638,859 | 2/1972 | MacFarlane | 239/102 |
| 3,662,557 | 5/1972 | Morgan | 62/279 |
| 3,774,846 | 11/1973 | Schurig | 239/102 |
| 3,835,810 | 9/1974 | Hughes | 116/137 A |
| 3,872,684 | 3/1975 | Scott | 62/181 |
| 3,874,595 | 4/1975 | Rindisbacher | 239/227 |
| 3,979,922 | 9/1976 | Shavitt | 62/97 |
| 3,990,427 | 11/1976 | Clinebell | 126/113 |

OTHER PUBLICATIONS

1972 Ashrae Guide and Data Book, chapter 4, pp. 29-43. Note especially: p. 29, 2nd column, 1st and 3rd paragraphs; pp. 42, 43, Fig. 14 and related text.
Sonic Nozzles Cut Fuel Costs 15 Percent by A. Muir, Plant Engineering, Dec. 19, 1972, pp. 42, 43.
Design Criteria for Energy Conservation, by G. Shavitt, Ashrae Journal Jun. 75, pp. 36-39.

*Primary Examiner*—William E. Wayner

[57] ABSTRACT

An environmental humidification and cooling system including an ultrasonic spray nozzle. Humidification is effected by spraying atomized water by the ultrasonic nozzle into the suction chamber of a fan. The cooling includes the ultrasonic spray nozzle spraying the atomized water into an entering air stream to effect evaporative cooling. Simultaneous evaporative cooling and humidification for an enclosed environment is effected by the spraying of moisture into a return air stream by the ultrasonic spray nozzle.

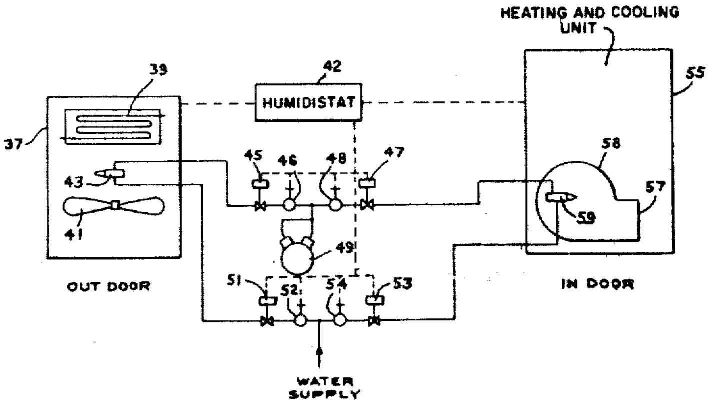

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

The drawing figure(s) have been changed as follows: Orientation of air control valve to nozzle 80 changed in FIG. 6.

AS A RESULT OF REEXAMINATION, IT HAS BEEN DETERMINED THAT:

Claims 2, 3 and 6–8 are cancelled.

Claims 1, 4 and 5 are determined to be patentable as amended.

New claims 9–12 are added and determined to be patentable.

1. In a closed environment air conditioning system receptive of air to be conditioned, *comprising*:

a heating/cooling unit including a chamber receptive of *a mixture of* recirculating *and outside* air before the air enters the heating/cooling unit;

means for simultaneously evaporatively cooling and humidifying the *mixture of* air to be conditioned comprising actuatable ultrasonic spray means including an ultrasonic spray nozzle positioned to spray into the *mixture of* recirculating *and outside* air in the chamber and receptive of a supply of water during use for atomizing the water and spraying same into the air to be conditioned and controllable compressor means for supplying pressurized air to the ultrasonic spray nozzle; and means for actuating and deactuating the ultrasonic spray means to control the level of humidification in the conditioned air[.], *said latter means including:*

*a first control valve operatively placed between the pressurized air and the ultrasonic spray nozzle;*

*a second control valve operatively placed between the supply of water and the ultrasonic nozzle;*

*a humidistat located to sense the humidity of air of the closed environment; and*

*controller means responsive to the humidistat and coupled to the first and second control valves to modulate the control valves and regulate the humidity of air sensed by the humidistat.*

4. In [an] *a closed environment* air conditioning system [according to claim 1, wherein the system is a closed environment system having] *receptive of air to be conditioned, comprising:* a heating/cooling unit [and] including a chamber receptive of *a mixture* of recirculating *and outside* air before the air enters the heating/cooling unit*;* [and wherein said ultrasonic spray nozzle is positioned to spray into the recirculating air in the chamber]

*means for simultaneously evaporatively cooling and humidifying the mixture of air to be conditioned comprising actuatable ultrasonic spray means including an ultrasonic spray nozzle positioned to spray into the mixture of recirculating and outside air in the chamber and receptive of a supply of water during use for atomizing the water and spraying same into the air to be conditioned and controllable compressor means for supplying pressurized air to the ultrasonic spray nozzle; and*

*means for actuating and deactuating the ultrasonic spray means to control the level of humidification in the conditioned air, said latter means including:*

*a first control valve operatively placed between the pressurized air and the ultrasonic spray nozzle;*

*a second control valve operatively placed between the supply of water and the ultrasonic nozzle;*

*a humidistat located to sense the humidity of air of the closed environment;*

*controller means responsive to the humidistat and coupled to the first and second control valves to modulate the control valves and regulate the humidity of air sensed by the humidistat and means for overriding said controller means when the humidity exceeds a predetermined high limit.*

5. In an air conditioning system receptive of *a mixture of recirculating and outside* air to be conditioned[;], *comprising:* an air cooling condenser[:]*;* means for simultaneously evaporatively cooling and humidifying the *mixture of* air to be conditioned comprising actuatable ultrasonic spray means including an ultrasonic spray nozzle positioned to spray into *the mixture of* air before entering the cooling condenser and receptive of a supply of water during use for atomizing the water and spraying same into the *mixture of* air to be conditioned and controllable compressor means for supplying pressurized air to the ultrasonic spray nozzle; and means for actuating and deactuating the ultrasonic spray means to control the level of humidification in the conditioned air *and including:*

*a first control valve operatively placed between the pressurized air and the ultrasonic spray nozzle;*

*a second control valve operatively placed between the supply of water and the ultrasonic nozzle;*

*a humidistat located to sense the humidity of air of the closed environment; and*

*controller means responsive to the humidistat and coupled to the first and second control valves to modulate the control valves and regulate the humidity of air sensed by the humidistat and means for overriding said controller means when the humidity exceeds a predetermined high limit.*

*9. In a closed environment air conditioning system receptive of air to be conditioned, comprising:*

*a heating/cooling unit including a chamber receptive of a mixture of recirculating and outside air before the air enters the heating/cooling unit;*

*means for simultaneously evaporatively cooling and humidifying the mixture of air to be conditioned comprising actuatable ultrasonic spray means including an ultrasonic spray nozzle positioned to spray into the mixture of recirculating and outside air in the chamber and receptive of a supply of water during use for atomizing the water and spraying same into the air to be conditioned and controllable compressor means for*

*supplying pressurized air to the ultrasonic spray nozzle;*

*and means for actuating and deactuating the ultrasonic spray means to control the level of humidification in the conditioned air and including:*

*a first control valve operatively placed between the pressurized air and the ultrasonic spray nozzle;*

*a second control valve operatively placed between the supply of water and the ultrasonic nozzle;*

*a humidistat located to sense the humidity of air of the closed environment; and*

*controller means responsive to the humidistat and having a common line coupled to both the first and second control valves to modulate the control valves and regulate the humidity of air sensed by the humidistat.*

*10. In the air conditioning system receptive of air to be conditioned as claimed in claim 9 wherein the common line is a common pneumatic air line coupled to both the first and second control valves for modulation thereof to regulate the humidity of air sensed by the humidistat.*

*11. In a closed environment air conditoning system receptive of air to be conditioned wherein a summer/winter signal is generated representative of summer or winter conditions, comprising:*

*a heating/cooling unit including a chamber receptive of a mixture of recirculating and outside air before the air enters the heating/cooling unit;*

*means for simultaneously evaporatively cooling and humidifying the mixture of air to be conditioned comprising actuatable ultrasonic spray means including an ultrasonic spray nozzle positioned to spray into the mixture of recirculating and outside air in the chamber and receptive of a supply of water during use for atomizing the water and spraying same into the air to be conditioned and controllable compressor means for supplying pressurized air to the ultrasonic spray nozzle; and*

*means for actuating and deactuating the ultrasonic spray means to control the level of humidification in the conditioned air and including:*

*a first control valve operatively placed between the pressurized air and the ultrasonic spray nozzle;*

*a second control valve operatively placed between the supply of water and the ultrasonic nozzle;*

*a humidistat located to sense the humidity of air of the closed environment;*

*controller means responsive to the humidistat and having a common line coupled to both the first and second control valves to modulate the control valves and regulate the humidity of air sensed by the humidistat; and*

*a third control valve coupled to the summer/winter signal for control thereby and operatively coupled to the controller means to apply a supply of air thereto or bypass air to a bleed.*

*12. In an air conditioning system as claimed in claim 11 wherein the means for actuating and deactuating the ultrasonic spray means further includes:*

*discharge duct mounted thermostat means operatively coupled to said controller means to enable evaporative cooling by said ultrasonic spray means of return air and fresh air.*

* * * * *